US009684413B2

(12) United States Patent
Goertz

(10) Patent No.: US 9,684,413 B2
(45) Date of Patent: Jun. 20, 2017

(54) LIGHT-BASED TOUCH SCREEN

(71) Applicant: Neonode Inc., Santa Clara, CA (US)

(72) Inventor: Magnus George Goertz, Lidingo (SE)

(73) Assignee: Neonode Inc., San Jose, CA (US)

( * ) Notice: Subject to any disclaimer, the term of this patent is extended or adjusted under 35 U.S.C. 154(b) by 145 days.

(21) Appl. No.: 14/224,632

(22) Filed: Mar. 25, 2014

(65) Prior Publication Data

US 2014/0218342 A1 Aug. 7, 2014

Related U.S. Application Data

(63) Continuation of application No. 13/014,925, filed on Jan. 27, 2011, now Pat. No. 8,692,806, which is a continuation of application No. 10/494,055, filed as application No. PCT/SE02/00200 on Nov. 4, 2002, now Pat. No. 7,880,732.

(51) Int. Cl.
*G06F 3/042* (2006.01)
(52) U.S. Cl.
CPC ............ G06F 3/042 (2013.01); G06F 3/0421 (2013.01)
(58) Field of Classification Search
CPC ............................................ G06F 3/041–3/047
See application file for complete search history.

(56) References Cited

U.S. PATENT DOCUMENTS

| 4,243,879 A | 1/1981 | Carroll et al. |
| 4,267,443 A * | 5/1981 | Carroll ..................... G01V 8/20 250/221 |
| 4,847,606 A | 7/1989 | Beiswenger |
| 5,053,758 A | 10/1991 | Cornett et al. |
| 5,179,369 A * | 1/1993 | Person .................. G06F 3/0421 250/221 |
| 5,406,307 A | 4/1995 | Hirayama et al. |
| 6,035,180 A * | 3/2000 | Kubes ................ G06F 3/03547 313/509 |
| 6,115,823 A * | 9/2000 | Velasco ................ G06F 1/3203 710/16 |

(Continued)

FOREIGN PATENT DOCUMENTS

EP 0330767 A1 9/1989

OTHER PUBLICATIONS

Plaisant, C.and Wallace, D., Touch Screen Toggle Design, CHI '92, May 1992.

(Continued)

*Primary Examiner* — Benjamin C Lee
*Assistant Examiner* — David Lee
(74) *Attorney, Agent, or Firm* — Soquel Group LLC

(57) ABSTRACT

Touch screen apparatus, including a display unit including a touch surface, a number of light pulse emitting units for emitting light pulses over and across the touch surface, a number of light pulse receiving units for measuring amounts of light received from the light pulse emitting units, circuitry for selectively activating the light pulse emitting units and the light pulse receiving units, and a calculating unit to control the circuitry to provide a low-frequency idle mode and a high-frequency active mode, wherein only one of the light pulse emitting units and one of the light pulse receiving units are activated in the idle mode, and to determine that a light pulse in the idle mode is broken, based on the measured amounts of light received at the one receiving unit.

5 Claims, 5 Drawing Sheets

(56) References Cited

U.S. PATENT DOCUMENTS

| | | | | |
|---|---|---|---|---|
| 6,208,330 B1* | 3/2001 | Hasegawa | ............... | G06F 3/038 |
| | | | | 178/18.01 |
| 6,310,609 B1* | 10/2001 | Morgenthaler | ......... | H04M 1/22 |
| | | | | 341/22 |
| 6,421,042 B1* | 7/2002 | Omura | .................... | G06F 3/011 |
| | | | | 345/156 |
| 6,429,857 B1 | 8/2002 | Masters et al. | | |
| 6,985,137 B2 | 1/2006 | Kaikuranta | | |
| 7,665,043 B2 | 2/2010 | Kho | | |

OTHER PUBLICATIONS

Pogue, D., Palm Pilot: The Ultimate Guide, Section 1.1.1.1, O'Reilly & Associates, 1999.

\* cited by examiner

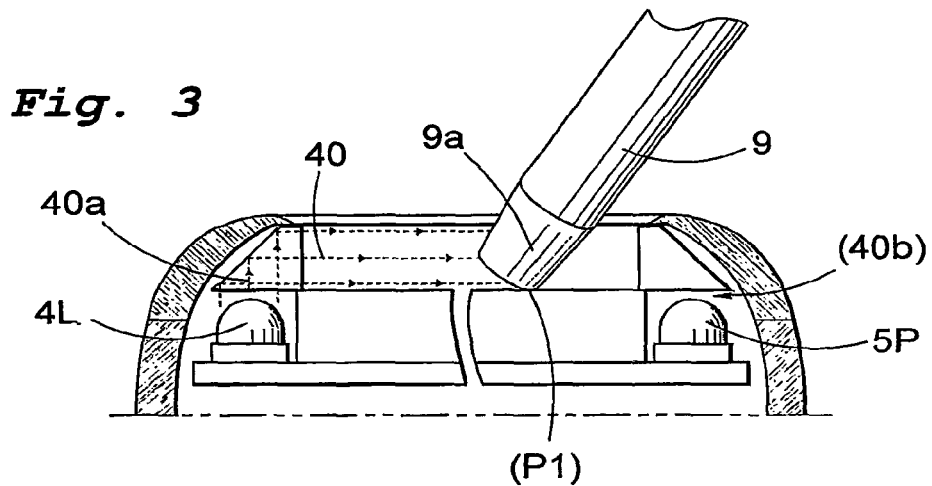
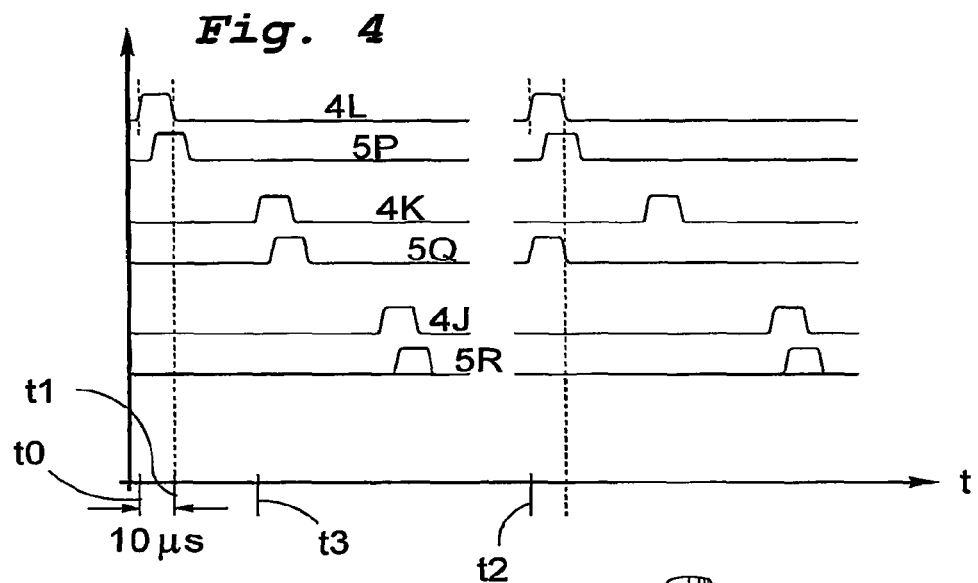
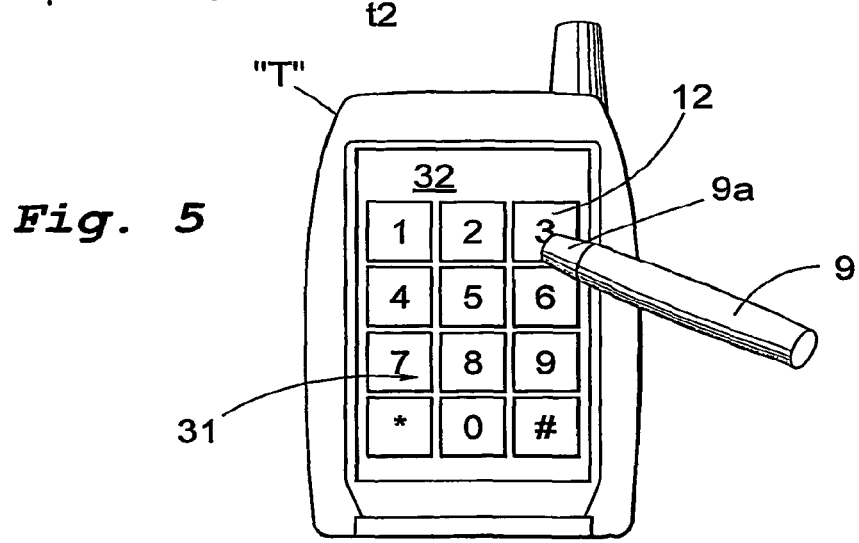

LIGHT-BASED TOUCH SCREEN

PRIORITY REFERENCE TO RELATED APPLICATIONS

This application is a continuation of U.S. application Ser. No. 13/014,925, now U.S Pat. No. 8,692,806, entitled ON A SUBSTRATE FORMED OR RESTING DISPLAY ARRANGEMENT and filed on Jan. 27, 2011 by inventor Magnus George Goertz. U.S. application Ser. No. 13/014, 925 is a continuation of U.S. application Ser. No. 10/494, 055, entitled ON A SUBSTRATE FORMED OR RESTING DISPLAY ARRANGEMENT and filed on Apr. 29, 2004 by inventor Magnus George Goertz. U.S. application Ser. No. 10/494,055 claims benefit of PCT Application No. PCT/SE02/02000, entitled ON A SUBSTRATE FORMED OR RESTING DISPLAY ARRANGEMENT and filed on Nov. 4, 2002 by inventor Magnus George Goertz.

FIELD OF INVENTION

The present invention relates generally to a display arrangement, that is formed onto or is supported by a substrate, and more particularly to a mobile-telephone-adapted touch screen arrangement, which is constructed with and around a display unit, whose external dimensions conform with those applicable to mobile telephone apparatus or cell phones.

The touch screen arrangement is hereinafter abbreviated to "touch screen".

DESCRIPTION OF THE BACKGROUND ART

Mobile telephone displays normally consist of an LCD unit and an associated keypad, where depression of a key activates one or more telephone functions.

It can be mentioned with regard to known technology, that the use of a touch screen has been proposed with regard to hand-carried computer terminals, with the intention of reducing the dimensions of a display surface, wherein selected functions can be activated through the medium of visible digits or other symbols, by exerting pressure on a surface section corresponding to the surface section of the symbol concerned, with the aid of a pointer.

Touch screens, or touch sheets, of this kind have been produced in the form of two mutually parallel plastic sheets, where a mechanical actuation of an uppermost sheet within a chosen surface section creates conditions for a resistance measurement perpendicular to said surface section, wherein the geographical position of said surface section on the touch screen can be established by a calculating circuit, with the aid of the resistance values established, and therewith generate a significant signal for a function related to a touched symbol.

In this case, there is used a hand-held and hand-maneuvered elongate pointer having a tip, comparable to that of a pencil or pen, which requires physical actuation on and pressure against the chosen surface section of the display unit.

Also known to the art are touch screens that have relatively large external dimensions, where the dimensions chosen and a chosen screen thickness are of small account and constitute no limitation to the chosen application.

For example, it is known in respect of this use application to allow the touch screen to be comprised of a display unit in the form of an LCD unit, with edge-orientated and mutually opposite light-emitting units and light receiving units.

More particularly, in the case of this application the light-emitting units and the light receiving units are orientated in two rows and two columns over the upper surface of the display unit, with the transmitting and receiving directions of the light rays orientated and directed immediately above the upper surface of the display unit, with said units directly opposite each other.

Light emitting circuits and light receiving circuits are also mutually co-ordinated and connected to a calculating or computing unit in this case, so as to evaluate and calculate a position representative of the geographical position on the upper surface of the display unit, where mutually intersecting light rays are shadowed by an object serving as a pointer, depending on the position of one or more coordinate-orientated light receiving units, having associated circuits which are intended to indicate the presence of light.

It is known in the case of this latter application to use the tip of an index finger as a pointer, and no physical actuation of or pressure against said display surface section is required in this particular technique, even though such is usual.

The contents of the patent publications listed below also belong to the earlier standpoint of techniques with regard to the use of a touch screen, in which light emitting and light receiving units and the tip of an index finger or the like function to activate signals corresponding to a chosen symbol presented on a surface section of the display surface.

U.S. Pat. No. 4,847,606

This publication illustrates and describes a control system (10), which in addition to a display panel (22) comprised of liquid crystals also includes a light source (20) and a light detector (36).

More specifically, the publication is concerned with allowing light from the light source to be directed through at least part of the liquid crystal display panel and onto the light detector.

The system (10) includes a casing (12), which is formed to be fitted to the instrument panel of a car, said panel including a sunken surface part (14) and being produced from a transparent material.

A casing part (18) is adapted to enclose the components related to the control system (10).

The light source (20) is illustrated in the form of a fluorescent lamp and is adapted to extend across the full width of the casing.

Light is able to pass through a number of "windows" (24) in the panel (22) and is reflected through 90 degrees by a mirror surface (26).

The light shall then pass a transparent casing-wall portion (28), and then through the sunken surface portion (14), and thereafter through an opposite wall portion (32), so as to be reflected onto the light detector or light receiver (36) by a mirror surface (34).

FIG. 1 of this patent publication shows that when a fingertip (49) is placed within the sunken surface (14), a number of light rays are shadowed within a defined area (48a), enabling this area to be detected.

FIG. 8 shows a system in which light sources and light detectors or light receivers are orientated in perpendicular co-ordinates.

U.S. Pat. No. 4,880,969

This patent publication describes and illustrates a programmable touch screen.

FIGS. 3 and 4 in particular illustrate an optical keyboard (12) which includes an IR-adapted light source (32), a light receiver (34) and optical "prism" or mirror surfaces (36, 38).

In this regard, FIG. 3 shows that these mirror surfaces (36, 38) are related to mutually opposite edge portions of a window surface (22).

EP-A1-0 330 767

This publication illustrates and describes a touch screen, which is adapted to create control signals by means of which a function can be selected in response to the movement and displacement of an operator's fingertip relative to the screen (1).

More particularly, this publication is concerned with the activation of a time circuit immediately when a finger or a fingertip touches the touch screen, where a particular movement direction and a particular distance of movement are detected and an electronic unit or the like is activated in response to these parameters.

The touch screen or touch panel (1) is provided along its four sides with light-emitting diodes (LED) (101-114) and light receiving devices in the form of phototransistors or photodiodes (201-214), as illustrated in FIG. 2.

The finger or the fingertip shadows one or more light beams orientated in a right-angled co-ordinate system, wherein shadowed light receiving devices and detected changes in shaded devices constitute magnitudes from which desired functions are evaluated and initiated.

SUMMARY OF THE INVENTION

Technical Problems

When taking into consideration the technical deliberations that a person skilled in this particular art must make in order to provide a solution to one or more technical problems that he/she encounters, it will be seen that it is necessary, on the one hand, to realise initially the measures and/or the sequence of measures that must be undertaken to this end, and on the other hand to realise which means is/are required to solve one or more of said problems. On this basis, it will be evident that the technical problems listed below are highly relevant to the development of the present invention.

When considering the earlier standpoint of techniques, as presented in the afore going, it will be seen that a technical problem resides in the ability to create conditions which enable a mobile telephone apparatus, or cell phone, to be provided with a touch screen that includes edge-related light-emitting units and oppositely located edge-related light receiving units together with associated circuits while retaining the small external dimensions of said apparatus, so that a geographical surface section and a function corresponding to said surface section can be established through the medium of a calculating unit, or computing unit, when certain light pulse receiving units do not indicate the reception of expected light pulses.

Another technical problem resides in the ability to create construction instructions that will provide conditions for reducing the space required by such a touch screen and for adapted planning and placement of said screen within the external confines of a mobile telephone.

A further technical problem resides in the ability to create conditions, with the aid of simple means, that enable energy consumption and power requirements to be kept low, with regard to the mobile telephone being battery powered, by generating short light pulses and by allowing the units to be activated sequentially in a chosen order.

In the case of this latter application, it will be seen that a technical problem resides in allowing the use of a number of pulse generating circuits, each connected to a respective light pulse emitting unit, and a number of light pulse receiving units, each connected to a respective pulse receiving circuit, and in the ability to establish, via a calculating unit, the geographic position of a user's fingertip, or thumb tip, on a front surface part, positioned so as to shadow one or more parallel, related light pulses and therewith indicate the absence of light pulses in one or more light pulse receiving units and unit-related pulse-receiving circuits.

When considering the earlier standpoint of techniques as described above, it will also be seen that a technical problem resides in the provision of structural changes in a touch screen, such as to enable the screen to be significantly thinner than prior art screens, so as to adapt said screen directly onto a mobile telephone.

A further technical problem resides in the ability to provide a touch screen, with which, in respect of other external dimensions of said screen, it is possible to create conditions which enable the external measurements of a mobile telephone unit to be reduced while, nevertheless, enabling the width of the display surface of a display unit to be made larger than the display surface of known mobile telephone units.

A further technical problem resides in the ability to realise the significance of and the advantages associated with allowing an inventive touch screen to be used as an alternative, not solely for a typical keypad but also for a standard display surface of a mobile telephone.

Another technical problem resides in the ability to realise the significance of and the advantages afforded by utilising a display unit in the form of an LCD unit, so as to enable each "key" to be included on the screen in the form of a graphic, so that when a pen, pencil, finger or a fingertip is placed on the same location or surface section where a key is presented, a chosen function and/or application corresponding to said graphic is activated and generated.

Still another technical problem resides in the ability to realise the significance of and the advantages afforded by using an LCD unit, whose upper surface can be allocated different information carrying structures according to a chosen menu, for different sequences within an information transmitting mode.

Another technical problem resides in the ability to realise the significance of and the advantages associated with orientating said light pulse emitting units and said light pulse receiving units adjacent said display unit, with the transmitting and receiving directions of the light pulses being perpendicular to, or at least generally perpendicular to, a flat upper surface of the display unit.

Yet another technical problem resides in the ability to realise the significance of and the advantages associated with placing at least two, normally four, pulse-deflecting devices close to the display unit and to its mutually opposite edge portions.

Another technical problem resides in the ability, to realise the significance of and the advantages associated with using as a supportive substrate a mobile telephone printed circuit board, that is capable of carrying an LCD unit or the like.

A further technical problem resides in the ability to realise the significance of enabling a substrate to support not only said display unit but also said light pulse emitting and light pulse receiving units, where said light pulses have a frequency within the infrared range (IR range).

Another technical problem resides in the ability to realise the significance of and the advantages afforded by enabling said light pulse emitting units and said light pulse receiving units to be connected to corresponding pulse generating circuits and pulse receiving circuits included in said substrate, through the medium of connection wires or the like.

Another technical problem resides in the ability to realise the significance of and the advantages afforded by allowing the light deflecting devices or light pulse deflecting devices to consist of a plurality of mirror units, co-ordinated with the casing of the mobile telephone unit.

Another technical problem resides in the ability to realise the significance of and the advantages associated with allowing said light pulse deflecting devices to consist of four mirror units, with their mirror surfaces orientated at 45 degrees in relation to the propagation direction of the light pulses, from said angled light pulse generating units and to said angled light pulse receiving units.

A further technical problem resides in the ability to realise the significance of and the advantages associated with allowing said light pulse deflecting devices to consist of a separate right-angled equilateral, three-sided and right-angled prism unit, having a light pulse deflecting mirror surface, or a corresponding means.

Another technical problem resides in the ability to realise the significance of and the advantages afforded by enabling a circuit board or a printed circuit board to carry electronic circuits and components adapted for carrying out functions related to the mobile telephone unit and/or to an associated mobile telephone network.

Another technical problem resides in the ability to realise the significance of and the advantages associated with allowing said light pulse emitting units and said light pulse receiving units to be orientated in respective rows and respective columns, with mutual perpendicular orientations and with a distance between said rows or columns that only slightly exceeds the dimensions chosen with respect to said display unit.

Another technical problem resides in the ability to realise the significance of and the advantages associated with allowing said circuit board carrying, inter al, said display unit, said light pulse emitting units, said light pulse receiving units and fixed components necessary to the function of the mobile telephone unit, to be adapted for attachment to a part of the complete casing of the mobile telephone unit.

Another technical problem resides in the ability to realise the significance of and the advantages afforded by fastening the edges of said light pulse deflecting devices along the raised rim portions of a recess in a casing part in the form of a replaceable lid, where said rim and said rim portions co-act with a transparent protective means, such as a plastic sheet.

In respect of certain conditions where a plurality of side-related light pulse receiving units and their associated pulse receiving circuits also indicate the absence of light pulses, another technical problem resides in the ability to realise the significance of and the advantages that are afforded by adapting the calculating unit to interpret this information, with the aid of internal computing circuits, as meaning that the intended geographical position shall be considered to be located between outer points representative of said pulse receiving circuits that indicate the absence of light pulses.

In respect of certain conditions where a plurality of angled and side-related light pulse receiving units and associated pulse receiving circuits indicate, at the same time, the absence of light pulses, another technical problem resides in the ability to realise the significance of and the advantages afforded by adapting the calculating unit to interpret this information, with the aid of internal computing circuits, as meaning that the intended geographical position shall be considered to be located between outer points representative of said pulse receiving circuits that indicate the absence of light pulses.

Another technical problem resides in the ability to realise the significance of and the advantages afforded by allowing said light pulse emitting units to be activated, through the medium of associated pulse generating circuits, either sequentially or in chosen positions in a predetermined order, and by allowing the corresponding light pulse receiving units and their pulse receiving circuits to be also activated in said predetermined order.

A further technical problem resides in the ability to realise the significance of and the advantages afforded by adapting a plurality of light pulse emitting units to emit light pulses consecutively over a chosen time duration, and by adapting one single light pulse receiving unit to be activated, via its pulse receiving circuit, so as to receive expected light pulses during said chosen time duration and therewith allow registration of occurring light pulses and/or shadowed light pulses or the absence of light pulses.

Another technical problem resides in the ability to realise the significance of and the advantages afforded by adapting a plurality of light pulse receiving circuits so that light pulses emitted from a single light pulse emitting unit can be received consecutively during said time duration, and by adapting the light pulse receiving units so that said units will be active, via pulse receiving circuits, during said chosen time duration for receiving expected light pulses and therewith allow registration of occurring light pulses and/or shadowed light pulses or the absence of light pulses.

Solution

The present invention takes as its starting point the known technology, as it is described above, and is based on a touch screen arrangement, which is built on or rests on a supportive substrate, and which is adapted for a mobile telephone apparatus or set and incorporated in the apparatus with the aid of a known display unit.

With the intention of solving one or more of the aforesaid technical problems related directly to mobile telephone apparatus or sets, the invention proposes the use of an arrangement, constructed in principle in accordance with what is used and proposed within other technical fields, said arrangement comprising a number of light pulse emitting units together with a number of oppositely located light pulse receiving units, said units both being edge-related to the display unit of said mobile telephone.

The light pulse emitting units are adapted to send light pulses sequentially through a short distance over the upper surface of a display unit, via associated pulse generating circuits, said upper surface presenting a graphic, such as rows and columns of geographically disposed symbols, such as letters, numbers and/or corresponding graphics.

The light pulse receiving units are adapted to receive light pulses sequentially, and each of the pulse receiving circuits and pulse emitting circuits are coordinated and connected to a calculating or computing unit.

The calculating unit will include calculating circuits, that function to evaluate a position representative of the geographical position on the upper surface of the display unit where light rays, such as intersecting light rays, are shadowed by a pointer, such as the front surface part of a user's thumb, depending on the position of one or more co-ordinate orientated light pulse receiving units and their associated pulse receiving circuits that should indicate the presence of a light pulse.

By way of proposed embodiments, that lie within the scope of the present invention, it is particularly proposed that said light pulse emitting units and said light pulse receiving units are orientated adjacent said display unit, with the light pulse emitting and light pulse receiving directions being at right angles, or at least generally at right angles, to a planar upper surface of the display unit.

Also proposed is the use of a number of light pulse deflecting devices, such as four devices, that are orientated close to the display unit and that function to cause mutually intersecting light pulses to pass parallel across the upper surface of the display unit.

By way of proposed embodiments that lie within the scope of the inventive concept, it is also proposed that a supportive substrate is comprised of a circuit board or printed circuit board of the mobile telephone unit.

In addition to carrying the display unit, the substrate is also adapted to carry said light pulse emitting and light pulse receiving units.

The light pulse emitting units and the light pulse receiving units are connected to said pulse generating circuits and said pulse receiving circuits co-ordinated on the supportive substrate, by connecting wires or the like.

Each of the light pulse deflecting devices may comprise a mirror unit, or a mirror portion, carried by the casing to provide a corresponding effect The light pulse deflecting devices may comprise mirror units that have mirror surfaces or casing-carried mirror surfaces orientated at 45 degrees in relation to the direction of propagation of the light pulses emitted by said light pulse emitting units towards said light pulse receiving units.

The light pulse deflecting devices may also comprise a right-angled equilateral, three-sided and right-angled prism unit.

The circuit board or printed circuit board, that functions as a substrate, may also support electronic circuits and components adapted to perform functions related to the mobile telephone unit or set.

The light pulse emitting units and the light pulse receiving units are orientated in two rows and two columns of mutual perpendicular orientations, with a distance between said rows and columns that only slightly exceeds corresponding dimensions of said display unit.

It is also proposed that the circuit board or printed circuit board that includes, inter al, display units, light pulse emitting units, light pulse receiving units, and fixed components, necessary to carry out the normal functions of the mobile telephone unit, is adapted to enable it to be fastened to or against part of the casing of the mobile telephone unit.

The light pulse deflecting devices are fastened, edge-orientated, along the raised rims of a replaceable lid or cover, said rims, or parts of said rims, co-acting with and supporting a transparent protective device, such as a plastic or glass sheet.

It is also proposed in accordance with the invention that conditions are provided whereby, when a plurality of side-related light pulse receiving units and their associated pulse receiving circuits indicate simultaneously the absence of light pulses, the calculating unit will interpret this information, with the aid of internal calculating circuits, as indicating that the intended geographical position shall be considered to be located at or between points representative of said light pulse receiving units, as an indication of the absence of light pulses.

In respect of conditions where a plurality of angled and side-related light pulse receiving units, and their associated pulse receiving circuits, simultaneously indicate the absence of light pulses, the calculating unit functions, with the aid of internal calculating circuits, to interpret this information to mean that the intended geographical position shall be considered to be located at one point or between points representative of said light pulse receiving units that indicate the absence of light pulses.

It is also proposed that when said light pulse emitting units are activated, via associated pulse generating circuits, either sequentially or positioned selectively in a predetermined order, the corresponding pulse receiving circuits shall also be capable of being activated in the same predetermined order.

A plurality of light pulse emitting units may be adapted to consecutively emit light pulses with the aid of said pulse generating circuits over a chosen time duration, wherein one single light pulse receiving unit is adapted to be activated to receive anticipated light pulses during said chosen time duration and therewith allow occurring light pulses and/or shaded light pulses or the absence of light pulses to be registered through the medium of an associated pulse receiving circuit.

A plurality of light pulse receiving units may be adapted to receive light pulses emitted from one single light pulse emitting unit consecutively during a chosen time period, wherein each of the light pulse receiving units is adapted to be activated, via associated pulse receiving circuits, to receive light pulses during said chosen time period and therewith allow occurring light pulses and shadowed light pulses and/or the absence of light pulses to be registered.

Advantages

Those advantages primarily characteristic of the present invention and the particular significant characteristics of said invention reside in the creation of conditions, which enable the creation of a touch screen arrangement for a mobile telephone apparatus or telephone unit or set on the basis of the technology described in the introduction, wherein edge-related light pulse emitting units and light pulse receiving units adjacent associated light pulse deflecting devices may be mounted adjacent the edge surfaces of a display unit or an LCD unit, and also in that the touch screen can thereby be given a particularly thin design, with low energy consumption and a limited power input.

More particularly, the invention makes possible clear evaluation of a small chosen surface section of a small display surface with the aid of the front surface part of a thumb, said surface part covering a surface section that greatly exceeds the small chosen surface section.

The primary characteristic features of the present invention are set forth in the characterising clause of the accompanying claim 1.

BRIEF DESCRIPTION OF THE DRAWINGS

An embodiment at present preferred and including significant characteristic features of the present invention will now be described in more detail by way of example and with reference to the accompanying drawings, in which;

FIG. 3 is a section view, according to FIG. 2, and shows a narrow pointer resting on the upper surface of a display unit for shadowing a light pulse;

FIG. 4 illustrates an example of pulse-form activation of the light pulse emitting and light pulse receiving units used, through the medium of pulse generating and pulse receiving circuits belonging to said units;

FIG. 5 is a horizontal view of a mobile telephone set that uses a touch screen in accordance with the present invention, and shows a narrow pointer positioned to rest on a surface section of the display unit, said section corresponding to a graphic symbol in the form of the number "3";

DESCRIPTION OF EMBODIMENTS AT PRESENT PREFERRED

It is pointed out initially that we have chosen to use in the following description of embodiments at present preferred and including significant characteristic features of the invention and illustrated in the figures of the accompanying drawings special terms and terminology with the intention of illustrating the inventive concept more clearly.

However, it will be noted that the expressions chosen here shall not be seen as limited solely to the chosen terms used in the description, but that each term chosen shall be interpreted as also including all technical equivalents that function in the same or at least essentially the same way so as to achieve the same or essentially the same intention and/or technical effect.

Figure 1:
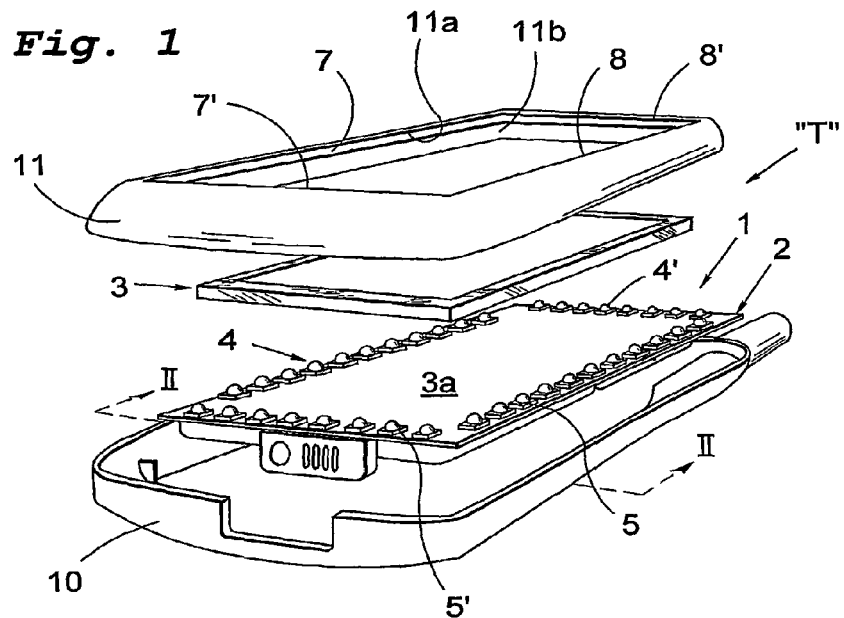
FIG. 1 is an exploded perspective view of a touch screen constructed in accordance with the invention and placed in a mobile telephone set.

FIG. 1 thus illustrates schematically an embodiment and an application of the present invention, said figure concretising generally the significant properties of the embodiment described in more detail below.

Thus, FIG. 1 is a perspective exploded view of a mobile telephone apparatus T whose casing parts 10, 11 enclose a touch screen arrangement 1, that rests on a supportive "substrate" 2, among other things.

The supportive substrate 2 of the illustrated embodiment has the form of a printed circuit board or a circuit board 2' of known design.

FIG. 1 is an exploded view of a mobile telephone apparatus T that includes a display unit 3 and edge-orientated light pulse emitting units 4 and oppositely located edge-orientated light pulse receiving units 5, which extend along respective sides of said display unit 3.

Although not shown, the "substrate" 2 may include edges that are raised from a display unit 3, in the form of a known LCD unit.

It is obvious that the basic principles of the present invention can be implemented solely with the use of rows or columns of light pulse emitting units 4 and oppositely located rows or columns of light pulse receiving units 5 with respective associated circuits 4a and 5a, at least with respect to the activation of certain functions.

It will be understood, from the following description of the illustrated embodiment, that the touch screen 1 belonging to the mobile telephone T is built around the display unit 3, with a number of light pulse emitting units 4, 4' orientated at right angles, and a number of light pulse receiving units 5, 5' orientated at right angles, said units being edge-related and surrounding said display unit 3 resting on the substrate 2.

For the sake of simplicity, requisite devices and connections to the substrate 2, and requisite functions for driving the LCD unit 3 in a known manner are not shown.

The units 4, 4' that emit pairs of mutually intersecting light pulses are adapted to emit short IR light pulses through the medium of pulse-generating circuits 4a, 4a'. One such IR light pulse is referenced 40 in FIG. 2, where it is shown orientated at a very small distance over the upper surface 3a of the display unit 3.

Figure 2:
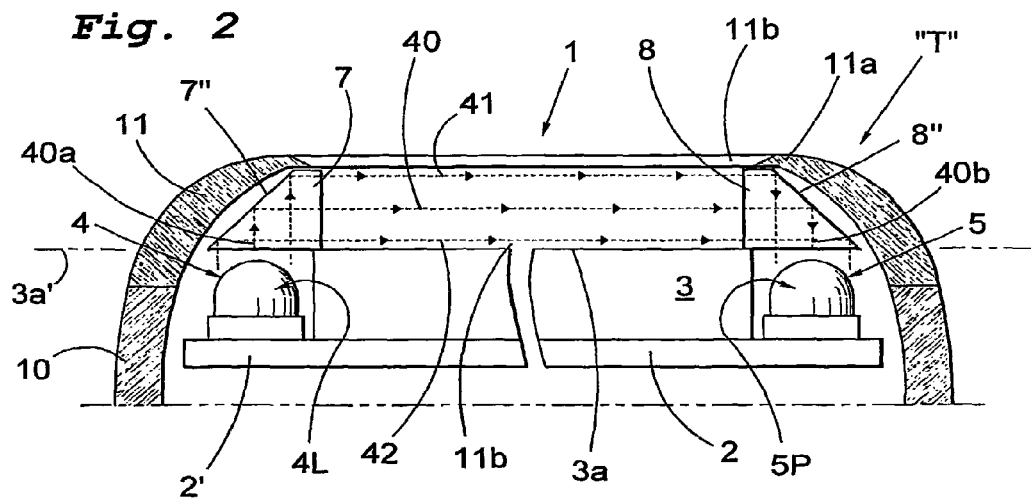
FIG. 2 illustrates in side view and in a section, taken on the line II-II in FIG. 1, a mobile telephone set and a touch screen assembly.

FIG. 2 shows three light pulse paths 40, 41 and 42, although for the sake of simplicity only the light pulse path 40 will be described in the following description.

The upper surface 3a shall be capable of presenting a number of graphic symbols in a known manner.

In the illustrated embodiment, this graphic display is chosen to comply with a chosen menu of a mobile telephone apparatus T.

Although these graphic symbols are shown to consist of digits (FIG. 5) orientated in rows and columns in the case of the illustrated embodiment, it will be understood that a display unit 3 in the form of an LCD unit can be caused to present a number of other symbols, such as digits/letters, words, sentences or corresponding graphic symbols, depending on the menu chosen.

Figure 6:
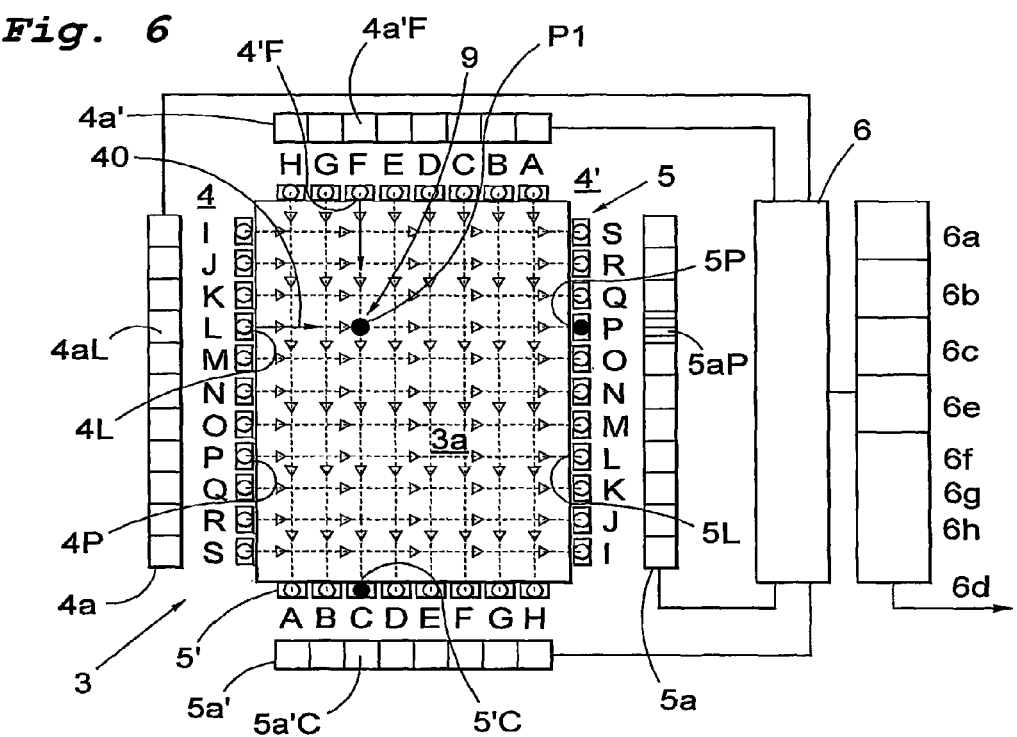
FIG. 6 is a schematic view of a planar display unit which is surrounded by a number of light pulse emitting and light pulse receiving units disposed in right-angle co-ordinates, in which a well-defined geographic point is shown to give a pronounced pulse shadow or the absence of light pulses in respect of two mutually perpendicular light pulse receiving units.

FIG. 6 illustrates schematically a number of pulse receiving circuits 5a, 5a' co-ordinated in right angle orientations, said circuits being adapted to receive signals from light pulses detected by the light pulse receiving units 5, 5', said units being referenced 5S, 5R, 5Q . . . 5J, 5I in one column, and 5'A, 5'B . . . 5'G, 5'H in one row.

A number of pulse emitting units 4, 4' in right angle orientation are adapted to emit light pulses via the control from co-ordinated pulse generating circuits 4a, 4a', said column-related pulse emitting units 4 being referenced 4I, 4J, 4K . . . 4R, 4S, while the row-related units 4' have been referenced 4'H, 4'G, 4'F . . . 4'B, 4'A.

The pulse receiving circuits 5a, 5a' are of a known kind and each circuit is adapted to generate current pulses or voltage pulses corresponding to the light pulses that are received by corresponding light pulse receiving units 5, 5', and to transpose these pulses into signal information sent to a calculating unit 6.

More specifically, the calculating unit 6, shown in FIG. 6, functions to activate each of the row-orientated units 4'H to 4'A and each of the column-orientated units 4I to 4S in a chosen order and, at the same time, open the oppositely located pulse receiving circuits 5a' and 5a.

This means that when the calculating unit 6 activates a light pulse emitting unit 4P during a time slot, the calculating unit 6 will expect said light pulse to be detected by the light pulse receiving unit 5L during the same time slot.

In such case, the calculating unit 6 allows associated calculating circuits, such as circuit 6a, to take an inactive state.

On the other hand, if the expected light pulse fails to arrive, e.g. is shadowed by a pointer 9, the calculating circuit 6a is activated.

The calculating unit 6 thus includes a plurality of calculating circuits, of which a calculating circuit 6*a* is adapted to allow the geographic position of the point P1 and its related row to be evaluated, depending on the position and the row (or column) of one or more co-ordinate orientated, light pulse receiving column-related units 5S-5I, one of which is referenced 5P in FIG. 6 in connection with the circuits 5*a*, and therewith activate a function that corresponds to this position in a chosen menu, via a function-related output signal generated on a conductor 6*d*.

An output signal of this kind is, of course, more complex than solely an output signal. Despite this, the output signal is not shown for the sake of simplicity.

The calculation performed in the calculating circuit 6*a* can be performed more precisely in order to be able to establish the two co-ordinates of a chosen geographical position of the point P1. This calculation can be based on the orientation of the light pulse receiving unit 5P and its connection to circuit 5*a*'C, by taking into account also the light pulse receiving unit 5'C, which receives no light pulse or which indicates a light pulse deficiency, meaning in practice that both units 5'C and 5P are shadowed by one single pointer 9 placed at the point or surface section P1.

The calculating unit 6 includes a further calculating circuit 6*b* that keeps an account of the activation of and the sequence assigned to respective circuits within the co-ordinations 4*a* and 4*a*' respectively and a light pulse emission from each of the column-related units 4I-4S and the row-related units 4'H to 4'A respectively, and emission-dependent activation of the individual circuits within the co-ordinations 5*a* and 5*a*' respectively and an anticipated reception of a light pulse in each of the units 5S-5I and 5'A-5'H respectively within their allotted time slots.

On the basis of information as to which of the units 5S-5I and the units 5'A-5'H should indicate the presence of a light pulse within its time slot but fails to do so, it is possible to evaluate a position that is representative of the two-dimensional geographic position P1 on the upper surface 3*a* of the display unit 3 where mutually intersecting light rays from the light pulse emitting unit 4L on the one hand and the light pulse from the light pulse emitting unit 4'F on the other hand, via respective circuits 4*a*L and 4*a*'F, is shadowed by a narrow pointer 9 in point P1, whereby solely those light pulse receiving units 5P and 5'C in connection with said circuits 5*a*P and 5*a*'C are shadowed, which is thus read in the calculating circuit 6 and causes activation of the calculating circuit 6*a*.

Returning to FIG. 2, it will be seen that the light pulse emitting units, such as the unit 4L, and the light pulse receiving units, such as the unit 5P, shall be orientated adjacent said display unit 3, with the directions of respective light pulses 40*a* and 40*b* from the pulse emitting and pulse receiving units are at right angles, or at least generally at right angles, to a plane 3*a*' orientated to coincide with the planar upper surface 3*a* of the display unit 3.

The invention also relates to the use of at least two pairs of mutually opposite light pulse deflecting devices 7, 8 and 7', 8', in practice four pairs of such devices, said devices being positioned very close to the display unit 3 and around the edges of said unit, in accordance with the FIG. 2 illustration.

It will also be seen that the supporting substrate 2 shall not only support a display unit 3 but also the series-orientated light pulse emitting units 4, 4' and the series-orientated light pulse receiving units 5, 5' in the form of a plurality of row-related light pulse emitting and mutually identical units 4, 4', and a plurality of row-orientated light pulse receiving and mutually identical units 5, 5' in mutually equal numbers on both sides of the display unit 3 for direct correspondence with each other.

The supportive substrate 2 may consist of the telephone circuit board 2' carrying discrete components (not shown).

The substrate 2 is thus not only adapted to support the display unit 3 centrally thereon, but also edge-related light pulse emitting units 4, 4' and the oppositely located light pulse receiving units 5, 5' disposed around all four edges of the substrate, and also the four mutually opposite devices 7, 8 and 7', 8' respectively.

The units 4, 4' emitting said mutually crossing light pulses and said units 5, 5' receiving said mutually crossing light pulses may conveniently be connected to said pulse generating circuits 4*a*, 4*a*' and said pulse receiving circuits 5*a*, 5*a*' by means of connecting wires or the like (not shown), said circuits conveniently being attached to or included as components in the circuit board 2'.

As will be seen particularly from FIG. 2, the light pulse deflecting devices 7, 8 may each consist of a mirror unit that has an angled mirror surface, where, in such case, the mirror surfaces 7", 8" of said mirror units will preferably be orientated at an angle of 45 degrees in relation to a vertical direction of propagation allocated to the light pulses 40*a*, 40*b*, to a horizontal direction of propagation 40 over the upper surface 3*a* of the display unit 3.

However, FIG. 2 shows that each light pulse deflecting device 7, 8 shall consist of a three-sidedright-angled prism-formed unit, where respective mirror surfaces 7" and 8" of said prism units will obtain the orientation disclosed in the introduction and extend along two rows and two columns of the units 4, 4' and 5, 5'.

The circuit board 2' may also carry electronic circuits and components adapted to perform functions related to a mobile telephone unit and a telephone network to which said unit is connected.

FIGS. 1 and 6 show that said light pulse emitting units 4 are column orientated and that said light pulse receiving units 5 are also column orientated, and that the light pulse emitting units 4' and the light pulse receiving units 5' are row-orientated and extend at right angles to said columns.

Thus, said units are orientated directly in opposing columns and rows with right-angled orientations there between and at a distance between said rows and columns that only slightly exceeds the dimensions of the display unit 3, as made evident in FIG. 2.

As shown in FIG. 2, the light pulse emitting units, such as the unit 4L, and the light pulse receiving units, such as the unit 5P, are positioned on the sides of the display unit 3 and closely adjacent the mutually opposite edges of said display unit, so as to provide a compact construction.

As will be seen from FIG. 1, the substrate 2, in the form of a circuit board 2' carrying, inter al, a display unit 3, light pulses emitting units 4, 4', light pulse receiving units 5, 5' and fixed components necessary to the function of the mobile telephone unit T, is adapted for fastening to a first casing part 10 of the telephone unit T intended for co-action with a second casing part 11. The mutually co-acting state of said casing parts is shown in FIG. 2.

The light pulse deflecting devices 7, 8, with their respective mirror surfaces 7", 8", and the light pulse deflecting devices 7', 8' with their mirror surfaces are disposed along a rectangular raised edge or rim 11*a*, included in the second casing part 11 as a replaceable lid or cover, where said rim 11*a* is able to co-act with and completely cover an opening with a transparent protective element 11b, such as a plastic sheet or glass sheet, positioned immediately above the display surface 3a.

FIG. 3 illustrates more specifically a proposed application of the present invention, where it is assumed that a pointer 9, a pencil, pen or the tip of an index finger, is brought to a position (P1) corresponding to a position P1 on the display unit 3, in accordance with FIG. 6, and that light pulses 40a emitted by the light pulse emitting unit 4L are shadowed (40) by the tip 9a of the pointer, whereby the light pulse receiving unit 5P will not receive any light pulses (40b) and will indicate, via a pulse receiving circuit 5aP, to the calculating unit 6 a light pulse absence within its allocated time slot and cause activation of the calculating circuit 6a.

In accordance with the FIG. 6 illustration, the calculating unit 6 is thereby able to ascertain that light pulses have been emitted within one and the same time slot not only by the unit 4L but also by the unit 4'F; and that no light pulse has been received either in the unit 5P or in the unit 5'C within said time slot, thereby enabling the geographic two-dimensional position of P1 to be calculated and evaluated and therewith enabling corresponding information to be sent to the circuit board 2' via the conductor 6d.

FIG. 5 is a schematic plan view illustrating the function shown in FIG. 3, and also shows activation of a surface section 12 in the same way as that earlier described with reference to a narrow pointer 9 and its tip 9a.

The surface section 12 is represented by the number 3, and the display unit 3 has been allocated a first display surface section 31, represented by the keypad of the mobile telephone apparatus T with its rows and columns of keys or buttons, and a second display surface section 32, represented by the presentation surface of said mobile telephone apparatus T.

Thus, the possibility of co-ordinating both the first display surface section 31 and the second display surface section 32 within one and the same display unit 3 lies within the concept of the invention.

Figure 7:
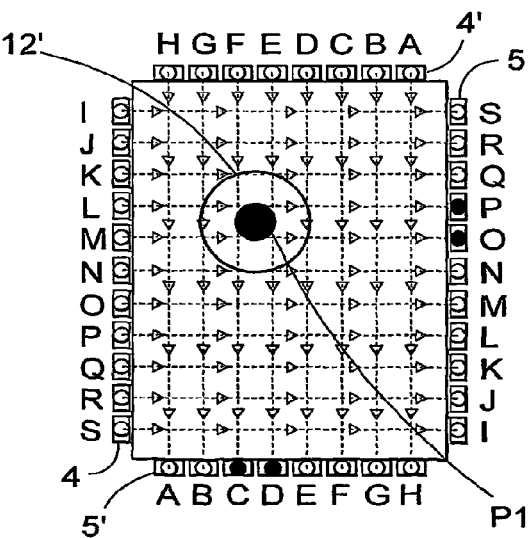
FIG. 7 illustrates an embodiment in which a large and diffuse geographic point creates a pulse shadow for at least two light pulse receiving units orientated at right angles and in pairs.

It should be noted in this respect, with reference to FIG. 7, that a marked surface section, such as a number-presenting surface section 12', may be diffuse and cover two or more light pulse receiving units, for instance units 5'B, 5'C, 5'D and 5'E, and four light pulse receiving units 5Q, 5P, 5O and 5N active against opposing light pulse emitting units 4'G, 4'F, 4'E, 4'D and 4K, 4L, 4M, 4N respectively, and that a correct indication may also be obtained even though all of said receivers indicate the absence of light pulse related signals or shadows within their respective time slots.

In this case, the calculating unit 6 is able to sort out peripheral units, in the present case the units 5Q, 5N and 5'B, 5'E respectively, with the aid of a calculating circuit 6c, and therewith deliver a clearer evaluation of the position P1 via the units 5P, 5O and 5'C, 5'D, in accordance with the spot markings in FIG. 7.

FIG. 4 shows a pulse plan applicable to the time-wise distribution of the light pulses, said plan being adapted to save energy and to increase intensity and light strength.

As a result of this pulse structure, each of the light pulse emitting and angled units 4 and 4' respectively will be actuated solely for a short period of time and within an allocated time slot.

During the short time slot t0-t1, in which a light pulse emitting unit, such as the unit 4L, is actuated, the calculating unit 6 ascertains, via an associated pulse receiving circuit 5a P, whether or not a light pulse has been received on an oppositely located receiver 5P. The time point for said evaluation is referenced t1.

Immediately after the status of the receiver 5P has been read, the light pulse emitting unit 4L concerned is extinguished at the end of a time slot t0-t1.

Disturbances that may be caused from ambient light can be suppressed, by temporarily increasing the intensity of each of the selected light pulse emitting units 4, 4'.

Thus, as will be seen from FIG. 6 in combination with FIG. 7, in respect of conditions where two or more side-related light pulse receiving units 5Q, 5P, 5O, 5N and associated pulse receiving circuits indicate simultaneously the absence of light pulses, the calculating unit 6 functions, with the aid of internal calculating circuits, such as circuit 6c, to interpret this information to mean that the intended geographical position P1 shall be considered to be located between the points, or consist of the most probable points, that are representative via said corresponding pulse receiving circuits.

Thus, FIG. 4 shows that each light pulse emitting unit shall be ignited over only a short time slot or pulse time, e.g. 10 μs, with an electric current higher than 1A, with a subsequent pause to a time point t2, which may be adapted to more than 100 times the chosen pulse time t0-t1.

Also shown in FIG. 4 is that the emission time or time slot t0-t1 for the unit 4L begins (t0) slightly before the activated reception time (t1) for the unit 5P, and that an idling time t1-t3 is caused to lapse prior to activation of an adjacent unit 4K within its time slot, where after the unit 5Q is immediately activated.

The same applies to the unit 4J and to the unit 5R and also remaining units, these latter units not being shown in FIG. 4.

With the intention of saving energy, a lower idling time frequency (t0-t2) can be chosen and only one unit, 4L, used. When the light pulse is broken, the display unit 3 is activated via a circuit 62, in accordance with the FIG. 4 pulse plan.

The light pulse emitting units are activated, via associated pulse generating circuits 4a, 4a', sequentially in a consecutive order or are selectively positioned in a predetermined order, and the corresponding light pulse detecting units 5, 5' can also be activated in said predetermined order, via the circuits 5a, 5a'.

Figure 8:
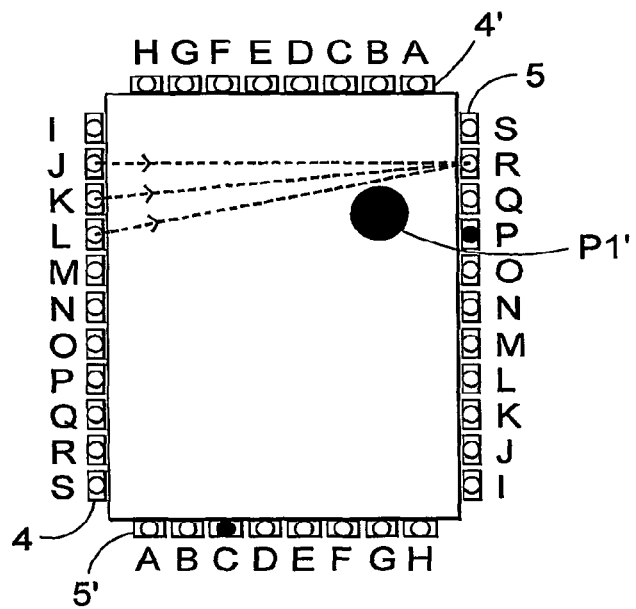
FIG. 8 illustrates an alternative embodiment for evaluating a geographic position valid for a geographic point.

FIG. 8 shows that a plurality of light pulse emitting units, referenced 4J, 4K and 4L, are adapted to send light pulses during a chosen time duration and during respective time slots, and that only one light pulse receiving unit 5R is adapted to be activated in this respect, so as to allow anticipated or expected light pulses to be received during said chosen time duration and within said time slots, and therewith allow occurring light pulses and shadowed light pulses to be registered so as to enable the geographical position of a more diffuse point, such as the point P1', to be evaluated.

Although not shown, it is obvious that a plurality of light pulse receiving units 5P, 5Q, 5R could be adapted to receive consecutively during a chosen time duration a plurality of light pulses emitted in time slots from solely one light pulse emitting unit, for instance the unit 4L, and to adapt the light pulse receiving units to be activated to receive anticipated light pulses during said chosen time duration and therewith allow occurring light pulses and shadowed light pulses to be registered.

Figure 9:
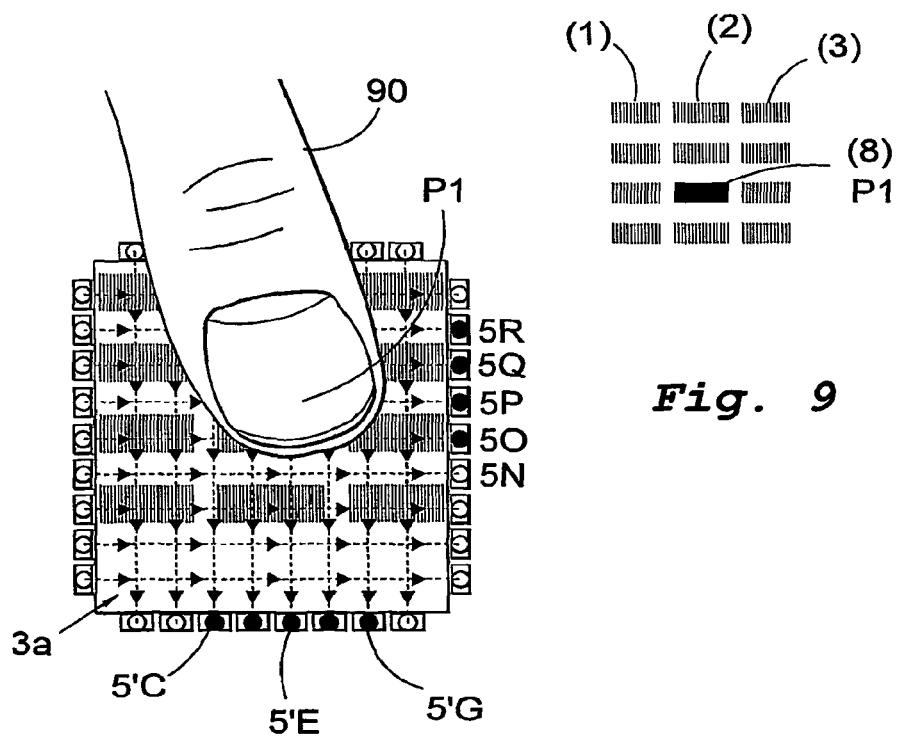
FIG. 9 illustrates a practical application of the principles indicated in FIG. 6 for activating a "key" or "button"

FIG. 9 shows a more realistic and practical application of the principles for activating a "key" or "button" indicated in FIG. 6.

Figure 10:
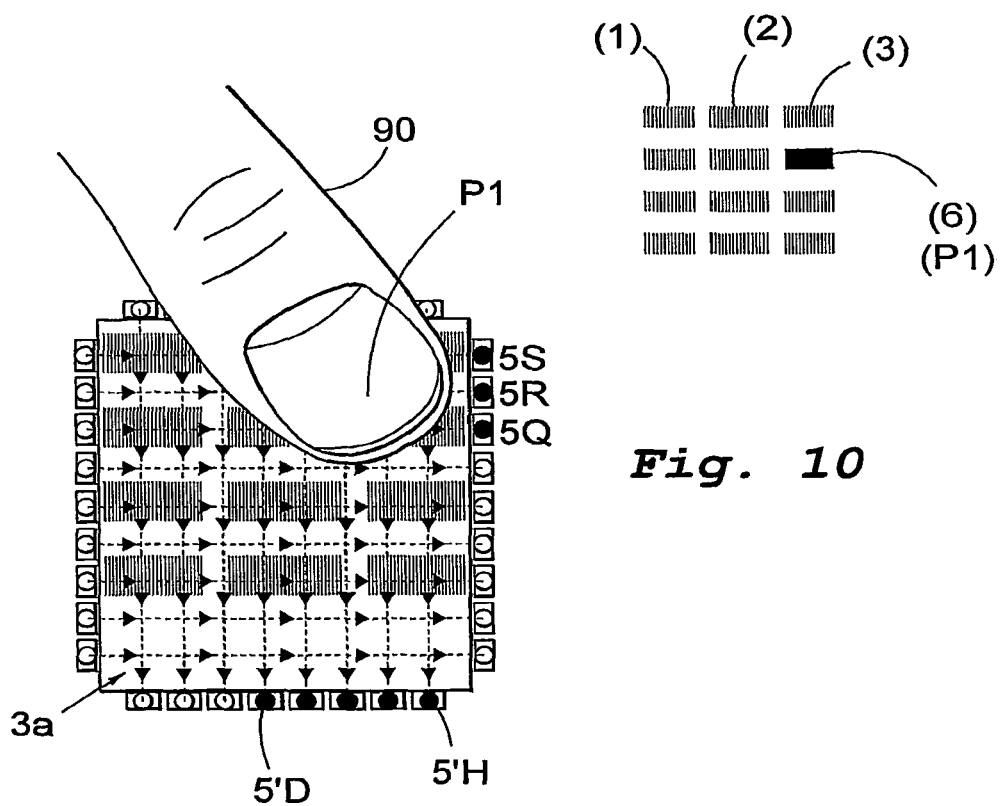
FIG. 10 illustrates a further practical application of the principles indicated in FIG. 6 for activating another key or button for activation of a mobile telephone function.

FIG. 10 illustrates a further practical application of the principles indicated in FIG. 6 for activation of another key or button for actuation of another mobile telephone function.

In this case, the display unit 3 with its upper surface 3a is actuated by a surface section of the thumb of the user, namely the thumb surface that faces inwards towards the palm of the user's hand, said surface therewith covering a large part of the surface section of the upper surface 3a.

In this regard, FIG. 9 shows that the surface section of the thumb 90 will shadow the column-related units 5R, 5Q, 5P and 5O and also the row-related units 5'C, 5'D, 5'E, 5'F and 5'G, and that the calculating circuit 6c functions to establish the key or button (8) that has been actuated, from this pattern of shadowed light pulses.

In this respect, FIG. 10 shows that the surface section of the thumb 90 will shadow the column-related units 5S, 5R and 5Q and also the row-related units 5'D to 5'H, and that the calculating circuit 6e is adapted to establish which button or key (6) has been actuated, from the pattern of shadowed light pulses.

The invention has been described with reference to sending short light pulses in the IR range.

The pulse technique enables stronger or weaker signals to be generated with the aid of a calculating circuit 6f so as to allow energy consumption and power output to be adapted to special ambient circumstances, such as sunlight or darkish surroundings.

Because the light pulse emitting units 4, 4' are ignited during a time slot of short duration, these units can be overloaded for higher light intensities without being destroyed.

In the case of a touch screen 1, constructed in accordance with the invention, it is solely the optical positioning P1 that is measured (no pressure requirement) thereby enabling movement of the thumb along the upper surface 3a of the display unit 3 to be determined in a calculating circuit 6g, such as determination of a sign or activation of a telephone function.

For example, the thumb 90 may be moved in a direction from right to left, so as to activate the "finish/close" function.

The proposed technique provides absolute positioning. This obviates the need to calibrate the unit.

By setting conditions for what shall be estimated as the measured position P1, the technique can be readily applied with a small display (restricted to said surface) as a keyboard.

Because no functional component is required over the display unit 3, there can be used a conventional plastic cover that can be changed when scratched.

The calculating unit 6c need not necessarily be adapted to calculate a centre of the pointer, e.g. of the thumb 90. It may, at times, be convenient to allow the outermost edge or outermost edges of the covered surface section to be read.

As will be evident from FIG. 9, orientation of the position P1 can be derived by the units 5'B and 5'H indicating light pulses, whereby the unit 5'E can be considered the most likely in this regard.

The position P1 is derived from the fact that the unit 5O does not indicate light pulses, but that the unit 5N does so.

This is interpreted as meaning that the key or button (8) located at a corresponding height shall be activated.

Correspondingly, FIG. 10 shows that the orientation of position P1 can be determined by ascertaining that the row-related units 5'D-5'H and the column-related units 5S, 5R and 5Q are extinguished.

This can be interpreted by the calculating unit 6c as meaning that the key or button (6) located on a row or at a height shall be activated.

The calculating unit 6 also provides a switch between an inactive state and an active state, wherein the inactive state provides a light pulse frequency of about 10 Hz, while the active state provides a time slot of 5-20 μs.

A time circuit 6h provides an automatic switch between these states or functions, such that a switch to the inactive state is carried out in the event of a waiting time of 2-5 sec. after an active state and in the absence of any actuation.

It will be understood that the invention is not restricted to the afore described exemplifying embodiments thereof, and that modifications can be made within the scope of the inventive concept illustrated in the accompanying Claims.

The invention claimed is:

1. A touch screen, comprising:
an activatable display unit comprising a touch surface;
a number of light pulse emitting units, connected to said display unit, emitting light pulses over and across said touch surface;
a number of light pulse receiving units, connected to said display unit, measuring amounts of light received from said light pulse emitting units;
circuitry, connected to said light pulse emitting units and to said light pulse receiving units, selectively activating said light pulse emitting units and said light pulse receiving units; and
a calculating unit controlling said display, and controlling said circuitry to operate in an active mode and in an idle mode, wherein (i) in the active mode said display is activated, and said circuitry activates all of said light pulse emitting and receiving units, at a high frequency, and a touch is detected when two or more light pulses emitted by the emitting units are blocked, as determined based on measured amounts of light received at the light pulse receiving units, (ii) in the idle mode said display is not activated, and the calculating unit monitors only a proper sub-area of said display by controlling said circuitry to activate only some of said light pulse emitting units and only some of said light pulse receiving units, at a low frequency, and (iii) the calculating unit switches the circuitry from the idle mode to the active mode in response to determining the presence of an object within the monitored sub-area, based on measured amounts of light received at an activated light pulse receiving unit in the idle mode.

2. The touch screen of claim 1 wherein said calculating unit controls said circuitry to switch from the active mode to the idle mode, when a designated waiting time expires without detecting a touch.

3. The touch screen of claim 2 wherein the designated waiting time is between 2 seconds and 5 seconds.

4. The touch screen of claim 1 wherein the high frequency is between 50 KHz and 200 KHz, and the low frequency is approximately 10 Hz.

5. The touch screen of claim 1, for a mobile telephone, wherein, in the active mode, said calculating unit detects linear movement of an object along and parallel to the touch surface, based on the measured amounts of light received at said light pulse receiving units, and activates a function to terminate a telephone call in response thereto.

* * * * *